US006966509B2

(12) United States Patent
Janzen

(10) Patent No.: US 6,966,509 B2
(45) Date of Patent: Nov. 22, 2005

(54) PILL CRUSHER

(75) Inventor: Richard Janzen, Black Creek (CA)

(73) Assignee: Iscore Partners, Black Creek (CA)

( * ) Notice: Subject to any disclaimer, the term of this patent is extended or adjusted under 35 U.S.C. 154(b) by 119 days.

(21) Appl. No.: 10/737,773

(22) Filed: Dec. 18, 2003

(65) Prior Publication Data

US 2005/0133645 A1 Jun. 23, 2005

(30) Foreign Application Priority Data

Nov. 17, 2003 (CA) .................................... 2449547

(51) Int. Cl.[7] ................................................ A47J 17/00
(52) U.S. Cl. ............................... 241/169; 241/DIG. 27
(58) Field of Search .......................... 241/DIG. 27, 169

(56) References Cited

U.S. PATENT DOCUMENTS

| | | | | |
|---|---|---|---|---|
| 2,631,786 | A | 3/1953 | Morgan et al. | |
| 3,915,393 | A | 10/1975 | Elkins | |
| 4,003,523 | A | 1/1977 | Doolittle | |
| 4,199,863 | A | 4/1980 | Deckert | |
| 4,366,930 | A | 1/1983 | Trombetti, Jr. | |
| 4,694,996 | A | 9/1987 | Siegel | |
| 4,824,000 | A | 4/1989 | Baxter et al. | |
| 5,123,601 | A | 6/1992 | Lavin et al. | |
| 5,148,995 | A * | 9/1992 | Hurst | 241/30 |
| 5,178,337 | A | 1/1993 | Lupoli | |
| 5,823,451 | A | 10/1998 | Sharpe | |
| 5,863,001 | A | 1/1999 | Schulze | |
| 5,915,637 | A | 6/1999 | Parsons | |
| 5,924,636 | A | 7/1999 | Calderon | |
| 6,059,209 | A | 5/2000 | Barson | |
| D433,148 | S | 10/2000 | Dennis | |
| 6,357,679 | B1 | 3/2002 | Radke | |
| 6,637,685 | B1 * | 10/2003 | Kruger | 241/169.1 |

* cited by examiner

*Primary Examiner*—Derris H. Banks
*Assistant Examiner*—Faye Francis
(74) *Attorney, Agent, or Firm*—Oyen Wiggs Green & Mutala LLP

(57) ABSTRACT

A portable pill crusher for crushing tablets of compressed powder has upper and lower plates, The plates attached to one another at one end, and forced apart at the opposite end so that the crusher is normally in a pill-loading position. The crusher has a handle attached to a post which extends upwardly from the lower plate through the upper plate, and the handle has a downwardly extending lobe which acts as a cam on the top surface of the upper plate, pushing it downwardly when a user applies a force to the handle. The upper plate has a crush member on its under-side which is sized and configured to fit within a pill receptacle formed on the end of the lower plate. The device can be operated by one hand, and requires little force to use.

10 Claims, 7 Drawing Sheets

PILL CRUSHER

TECHNICAL FIELD

The present invention relates to devices for crushing materials and in particular relates to devices for quickly and securely crushing crushable pills and other such medicaments to allow patients to ingest them more easily.

BACKGROUND

Medicaments are often provided in the form of pills, and many pills are in the form of tablets comprising compressed agglomerations of powder. These tablets are capable of being crushed into smaller pieces and/or powder.

There are several problems associated with administering medicaments in a tablet form. Many people have difficulty swallowing tablets, and it is not uncommon for such people to require that the tablets be crushed to make them easier to swallow. In an institutional setting (for example, in a hospital), it is common to crush tablets into smaller pieces and/or powder and to mix the resulting smaller pieces and powder into pudding or some other food substance to make the medicament more easily ingestible.

At one time, pills were crushed in hospitals using a mortar and pestle. The use of a mortar and pestle was long ago abandoned, due to several problems. Primarily, a mortar and pestle required too much time and energy to use, and required cleaning between uses to avoid cross-contamination of the medications in the crushed tablets.

Accordingly, over the years many mechanical devices have been suggested for crushing pills, among them those devices described in U.S. Pat. Nos. 2,631,786, 3,915,393, 4,003,523, 4,199,863, 4,366,930, 4,694,996, 4,824,000, 5,123,601, 5,178,337, 5,823,451, 5,863,001, 5,915,637, 5,924,636, 6,059,209 and 6,357,679.

Each one of these prior art pill crushers has disadvantages, however. Either they are not capable of crushing the large numbers of pills which are crushed daily in an institutional setting, or they do not provide means to avoid cross-contamination of crushed medications unless they are thoroughly cleaned between uses (which requires a significant amount of time and energy), or they require a considerable amount of force to use. The latter is a significant problem in institutional settings where hundreds of pills might be required to be crushed by a single person (perhaps a nurse) each day. While large-scale crushers have also been proposed, these are generally electrically-powered, heavy devices, and are not portable.

The need remains, accordingly, for a portable pill crusher capable of easily crushing large numbers of pills using only a small amount of force, and in which cross-contamination of medications is easily avoided.

SUMMARY OF INVENTION

The present invention is a device for crushing crushable pills. In the most basic embodiment of the invention, upper and lower plates are attached to one another at one end. The lower plate has a first, free end and the attached second end. The upper plate has an upper surface, a first end and the attached second end.

A receptacle for accepting crushable pills projects upwardly from the first end of the lower plate, and a crushing member projects downwardly from the first end of the upper plate. The crushing member is preferably sized to fit within the receptacle when the two are positioned together.

Between the plates is mounted a means for urging the first ends of the upper and lower plates away from one another. The device also comprises a post extending upwardly from the lower plate through the upper plate, with the post positioned between the second end of the lower plate and the receptacle on the lower plate.

The post is preferably positioned nearer to said receptacle than to said second end of said lower plate.

A handle is provided which is pivotally attached to the post at a position above the upper plate. The handle may be attached at one end to the top end of the post. The handle has a lobe extending downwardly therefrom to abut and apply a camming force to the upper surface of the upper plate. The device is operable by means of the handle between a pill-loading position wherein the first ends are urged apart by the urging means and a pill-crushing position wherein the first ends are nearer one another, placing the crush member within the receptacle.

In one embodiment of the invention, the means for urging the first ends away from one another comprises a spring coiled around the post between the lower and upper plates. In an alternate embodiment, the urging means is a leaf spring attached between the lower plate and the upper plate. In yet another embodiment, the upper and lower plates are formed from one sheet of material bent over on itself, and it is merely the natural elasticity of the material which comprises the means for urging the ends of the device apart.

To allow for more efficient placement of pills into the device, and to perform a good crush, the receptacle may have a concave face and the crushing member may have a convex end. The receptacle may be suitably sized to accept one or more paper cups.

To provide support for the device, the upper plate may have attached to its sides downwardly extending support members, which may extend generally along one third of the length of the upper plate from the first end thereof.

There is also provided a method of crushing pills, comprising the steps of (a) placing pills to be crushed into a first paper cup; (b) placing a second paper cup into the first paper cup, thereby covering the pills; (c) placing the paper cups into the receptacle of the device while the device is in the pill-loading position; (d) applying a downward force to the handle, thereby forcing the device into the pill-crushing position; (e) removing the force from the handle, allowing the urging means to urge the device into the pill-loading position; and (f) removing the paper cups from the device.

BRIEF DESCRIPTION OF DRAWINGS

It will be appreciated that the particularized description of the invention described briefly above which follows hereafter is rendered by reference to certain specific embodiments of the invention which are illustrated in the appended drawings. The drawings depict only a typical embodiment of the invention and are not therefore to be considered to be limiting of its scope.

Accordingly, in the accompanying drawings which illustrate specific embodiments of the invention, but which should not be construed as restricting the spirit or scope of the invention in any way.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
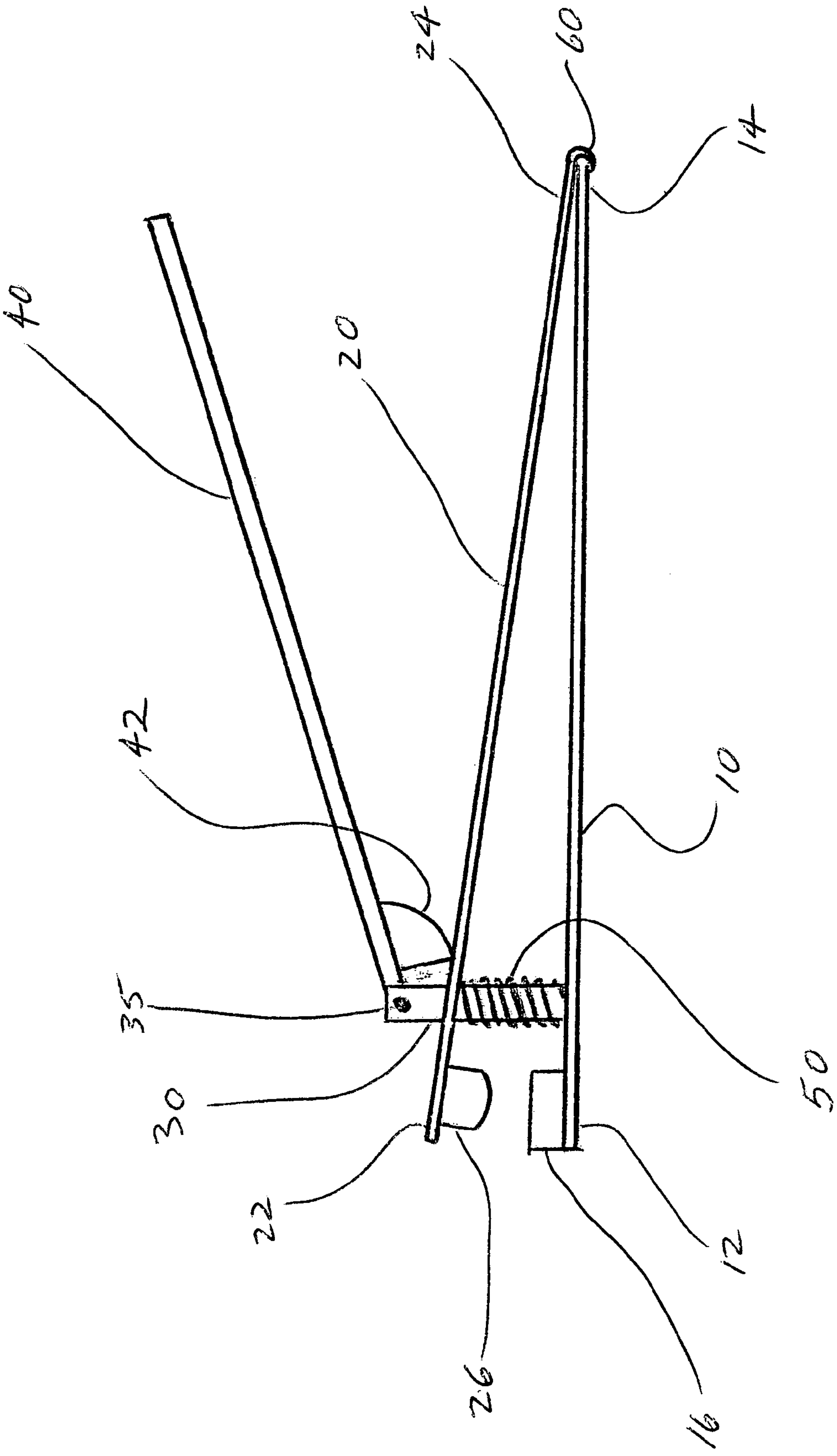
FIG. 1 is a side view of one embodiment of a pill crusher of the present invention, in an open or "pill-loading" position.

Referring first to FIG. 1, the pill crusher of the present invention may be constructed generally of two rectangular plates, a lower plate 10 and an upper plate 20. The device may be used with lower plate 10 placed upon a flat surface such as a table top or a counter top.

Lower plate 10 has two ends, a first end 12 and a second end 14. Similarly, upper plate 20 also has a first end 22 and a second end 24. Plates 10, 20 are attached to one another at one end (the respective second ends, as shown in the drawings), and may be hinged together by means of hinge 60.

Figure 2:
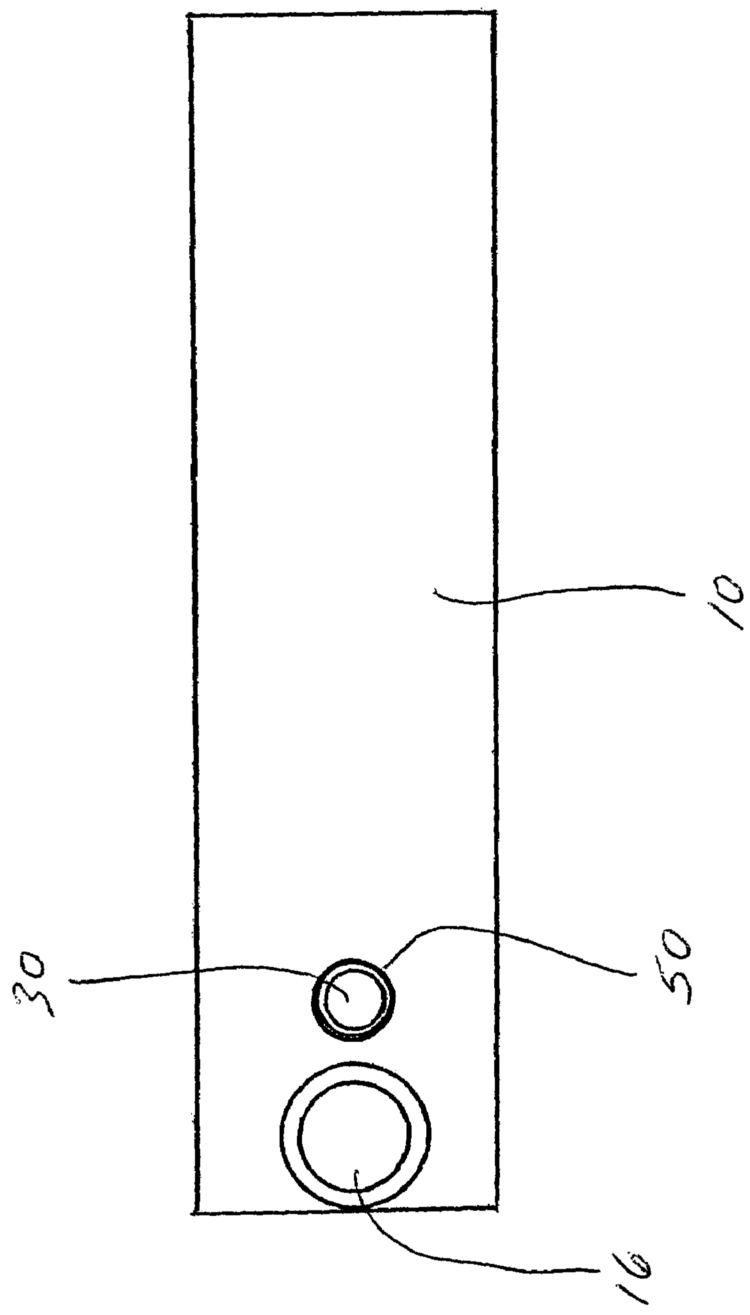
FIG. 2 is a plan view of the top surface of the bottom plate of the pill crusher shown in FIG. 1.

Lower plate 10 has extending upwardly from its upper surface a receptacle 16 for accepting crushable pills. Receptacle 16 is also clearly illustrated in FIG. 2. Receptacle 16 is located at the first end of lower plate 10. As described herein, the term "at the end" of lower plate 10 is intended merely to describe that the receptacle is at or near the end of plate 10. It is foreseen that the receptacle 16 need not be precisely at the very end of plate 10, but rather need only be nearby. The receptacle should be considered to be "at the end" of plate 10 as contemplated by the inventor if the center of the receptacle occupies a longitudinal position within the first fifth of the length of plate 10 from end 12.

Figure 3:
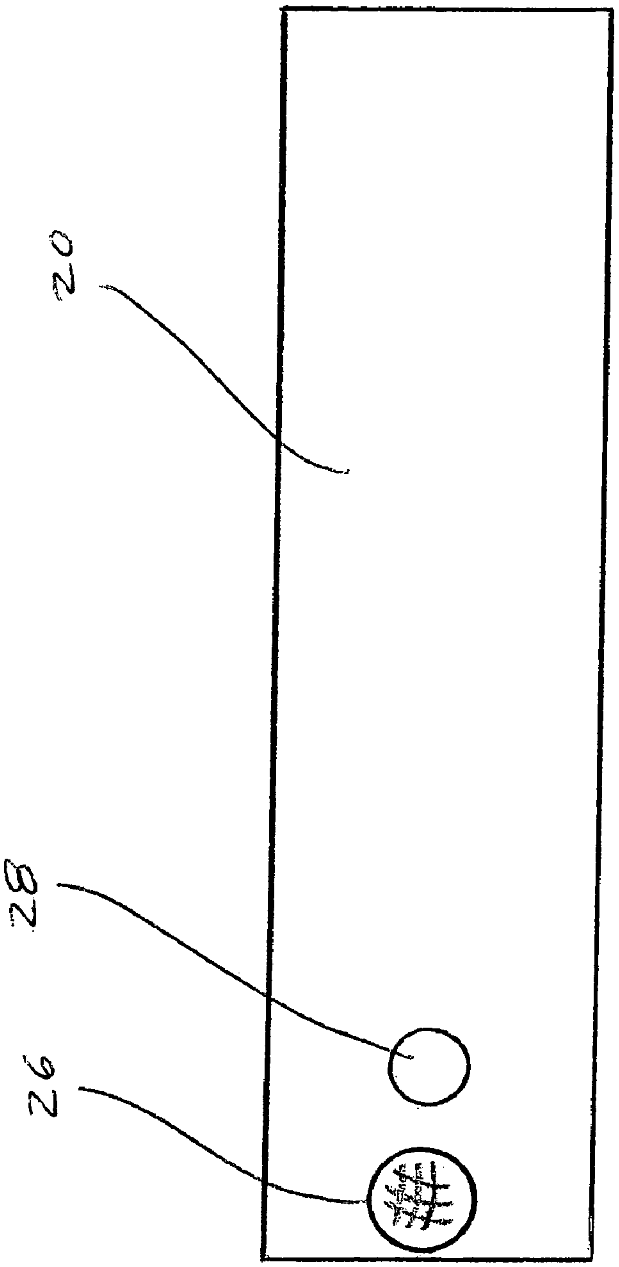
FIG. 3 is a plan view of the bottom surface of the top plate of the pill crusher shown in FIG. 1.

Similarly, upper plate 20 has a crush member 26 extending downwardly from the lower surface of plate 20 at the "end" of plate 20. It is intended that the "end" of plate 20 as described herein means the first fifth of the length of the plate 20 as described above with reference to receptacle 16. The crush member 26 is illustrated in greater detail in FIG. 3.

Receptacle 16 and crush member 26 may be of any shape when view end-on or from the side, but both are preferably round or cylindrical. The top surface of receptacle 16 is preferably "cup-shaped" or concave, while the crush member 26 preferably has a convex end. It will be appreciated from the figures and the description herein that crush member 26 is sized and configured to fit or "nest" tightly within receptacle 16 when the device is in a crushing position.

Referring again to FIG. 1, a post 30 extends upwardly from the top surface of the lower plate 10, and extends through a hole (labelled "28" in FIG. 3) formed through upper plate 20. It will be appreciated that hole 38 should be large enough second plate 20 to move between an elevated position and a lowered position as described below without binding on post 30.

An arm 40 is pivotally attached to post 30 above the top surface of upper plate 20 at attachment point 35. The post 30 may be positioned anywhere along the length of lower plate 10 between the receptacle 16 and second end 14, but is preferably close to receptacle 16 to allow force applied to handle 40 to provide good leverage as described in greater detail below. Similarly, post 30 extends through plate 20 at a corresponding point between crush member 26 and second end 24, but preferably near crush member 26.

Figure 5:
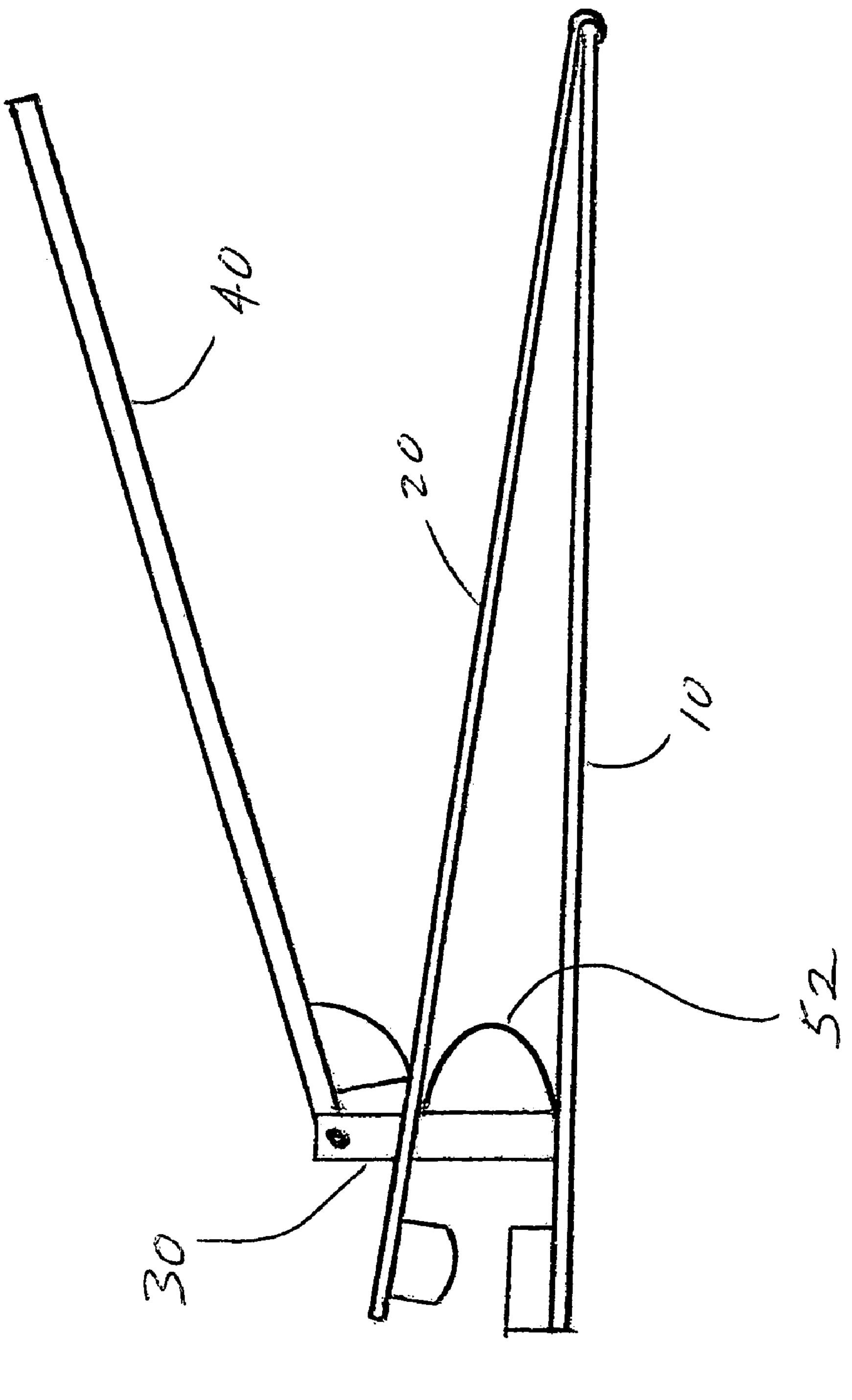
FIG. 5 is a side view of an alternate embodiment of the pill crusher shown in FIG. 1, having a leaf spring.

It will be appreciated that an upper plate, hinged to a lower plate as described herein, would normally tend to fall and rest on the lower plate due to gravity. Means for urging the first ends 12, 22 of plates 10, 20 apart is therefore provided to urge the first end 22 of the upper plate 20 up and away from the first end 12 of the lower plate 10, thereby forcing the upper plate 20 into an elevated position above the lower plate 10 and placing the device into a "pill-loading" position wherein the receptacle 16 is easily accessible to the user. In the embodiment of the invention shown in FIG. 1, this urging means is conveniently a spring 50 coiled around the post 30. It should be clear that many other devices to urge apart the plates might be contemplated by those skilled in the art, including a leaf spring 52, as shown in FIG. 5, affixed between plates 10 and 20. Other devices are contemplated by the inventor but not described herein in detail to avoid obscuring the invention.

Figure 4:
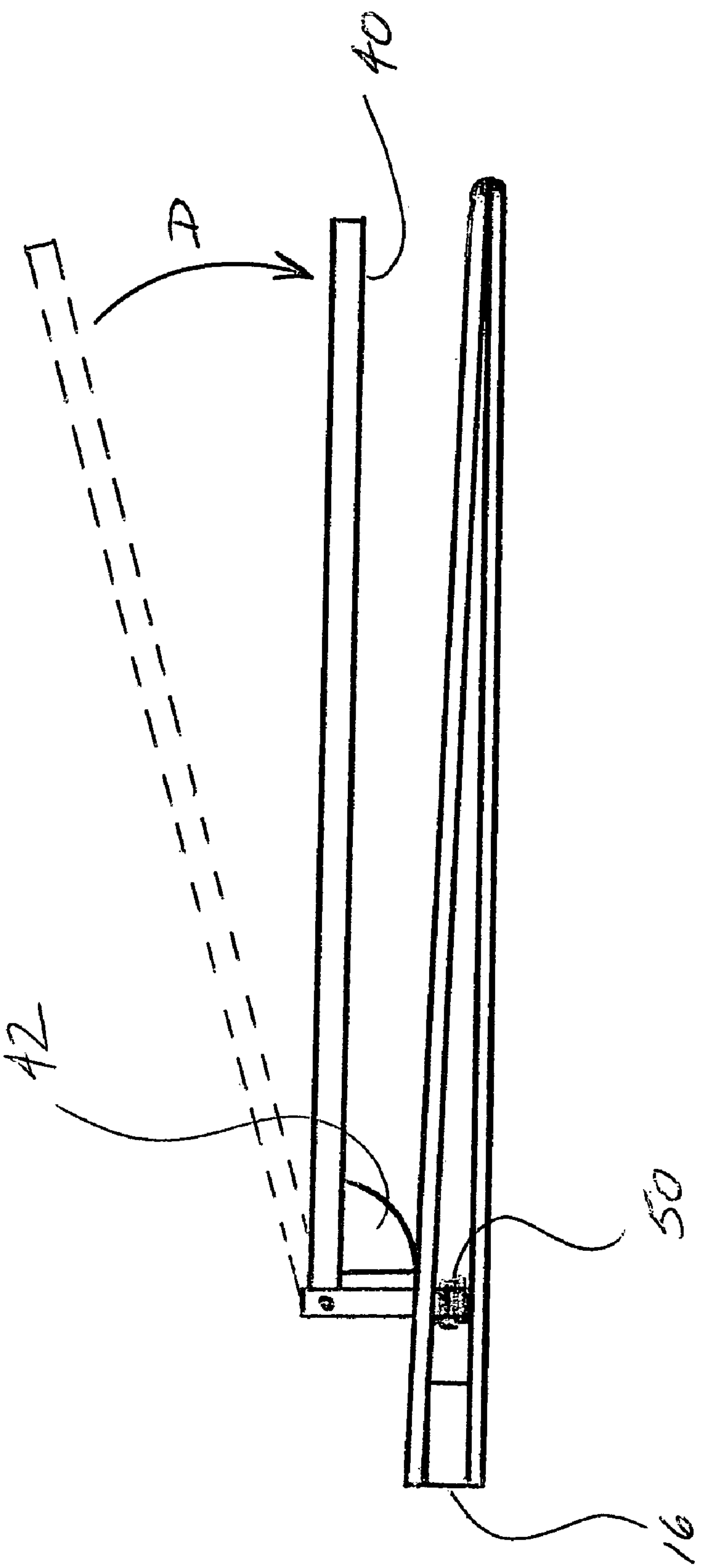
FIG. 4 is a side view of the pill crusher shown in FIG. 1, in a closed or "pill-crushing" position.
Figure 7:
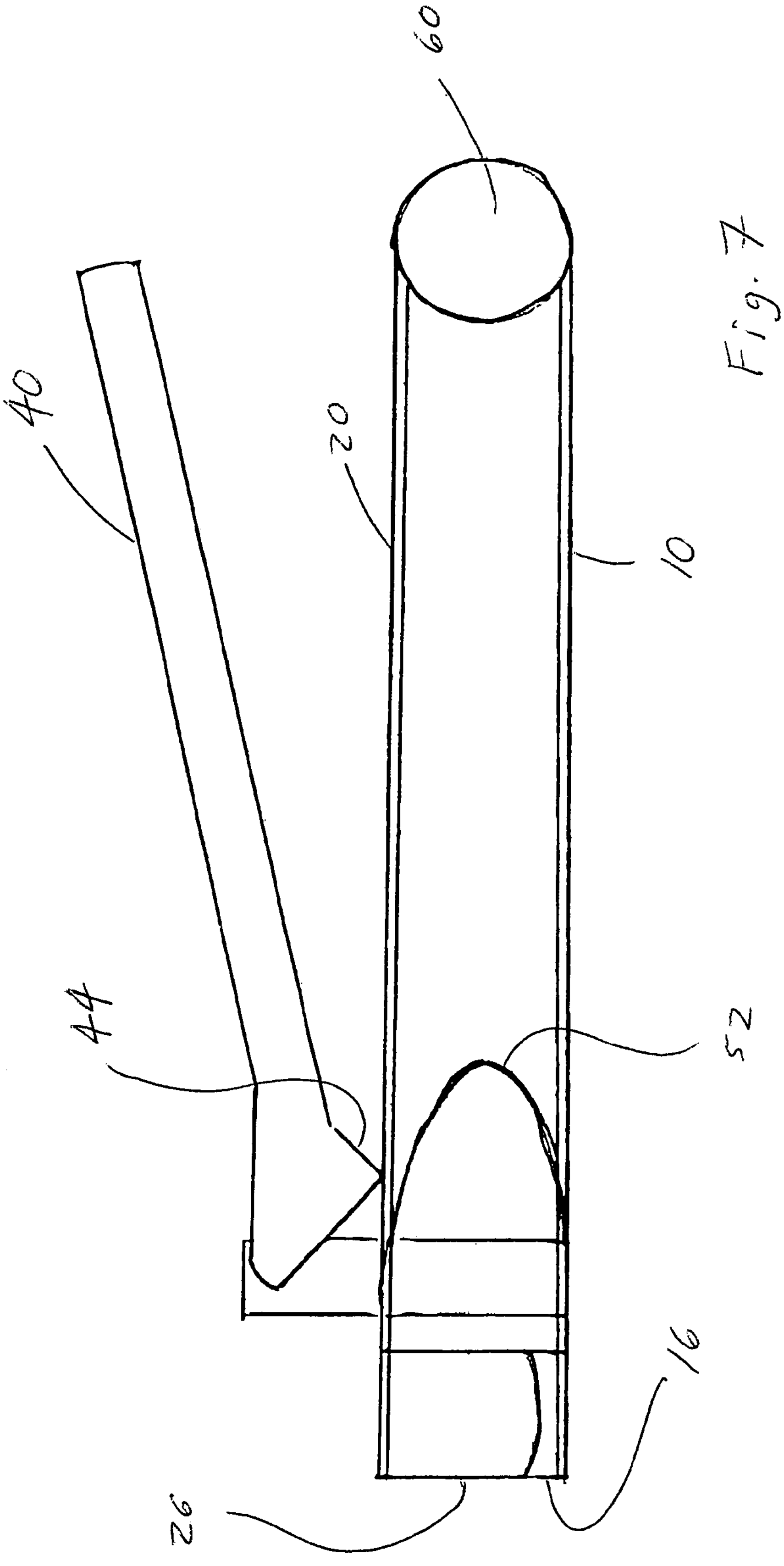
FIG. 7 is a side view of an alternate embodiment of the pill crusher of the present invention, showing the handle having a non-rounded cam.

To transfer force applied to handle 40 to top plate 20, handle 40 is supplied with a lobe 42 which extends downwardly therefrom and which abuts the upper surface of upper plate 20 as shown in FIGS. 1 and 4. The lobe 42 acts as a cam to transfer force applied by a user to the handle 40 to the upper surface of upper plate 20 and in turn to crush member 26 which will crush pills placed within receptacle 16 if enough force is applied. The lobe 42 is preferably rounded, but need not be, and may be any shape as long as it is able to act as a cam on the top surface of upper plate 20. An alternate cam arrangement is illustrated in FIG. 7, with handle 40 having a non-rounded cam 44.

Figure 6:
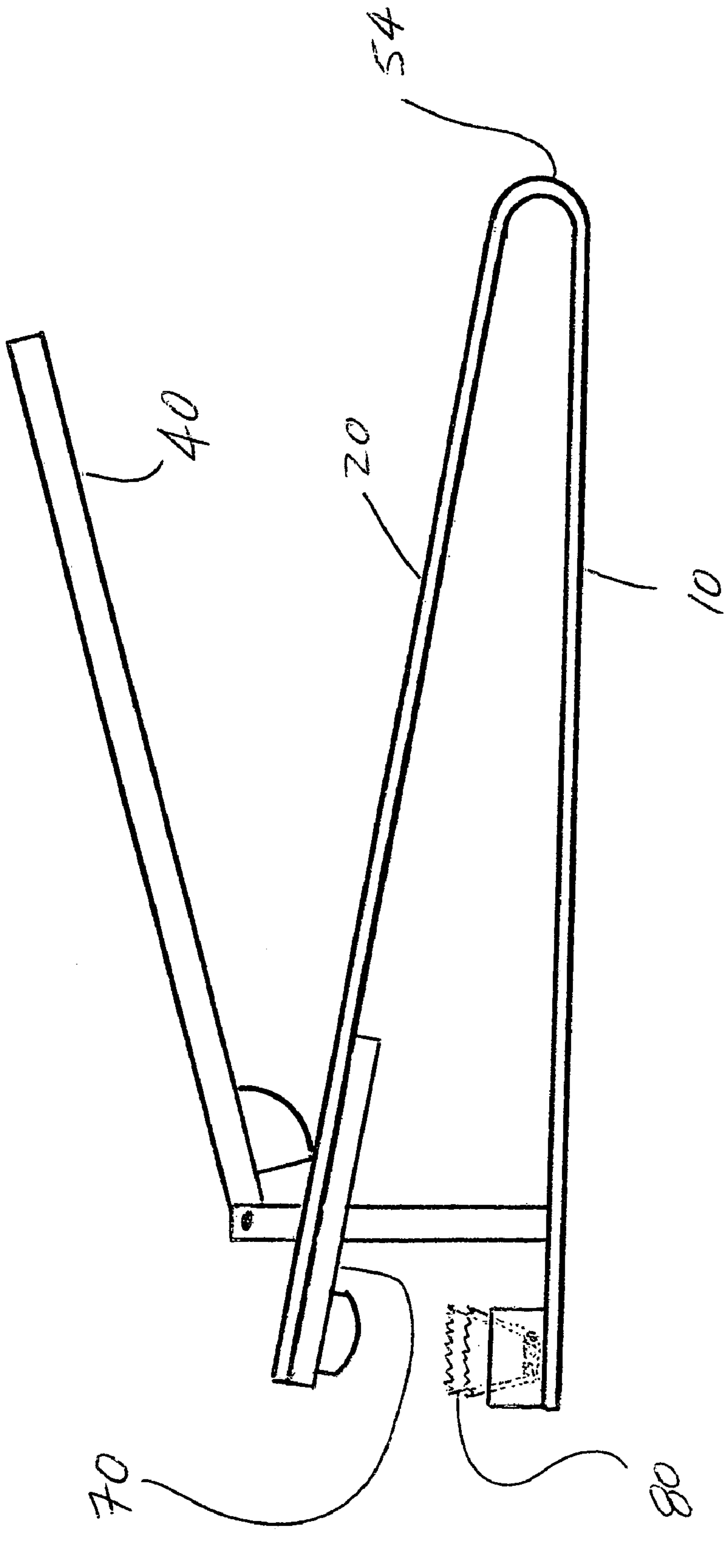
FIG. 6 is a side view of an alternate embodiment of the pill crusher of the present invention, with the top and bottom plates being formed of a single sheet of material.

In operation, the device is normally in an open or "pill-loading position (shown in FIG. 1). As previously described, the device is urged into this position by spring 50. When it is desired to crush a pill or a plurality of pills, the pills are placed by the user into receptacle 16. To avoid cross-contamination of medications, and to avoid having to clean the device after each use to avoid cross contamination, the pills may be conveniently placed between two paper cups 80 as is currently common in the art. A plurality of pills in between paper cups 80 is illustrated for the sake of completeness in FIG. 6.

Referring to FIG. 4, once the pills are inserted by the user into receptacle 16, the user applies a force to handle 40, moving handle 40 in the direction "D" as shown in FIG. 4. the nature of the construction of the device allows the user to apply this force with only one hand, if desired. By applying force to handle 40 as shown in FIG. 4, handle 40 moves from the elevated position shown in FIG. 1 to the closed or "pill-crushing" position shown in FIG. 4. As handle 40 moves downwardly, the lobe 42 on handle 40 acts as a cam to transfer the force applied to handle 40 to the top surface of upper plate 20, forcing upper plate 20 downwardly with respect to lower plate 10. As noted above, with crush member 26 properly configured, crush member 26 is forced against or even into receptacle 16, thereby crushing the pills contained therein. In the meantime, spring 50 has been compressed by the downward motion of upper plate 20, as shown in FIG. 4, and is able to exert an opposing force on the upper plate when the user relieves the force which had been applied to handle 40. Upper plate 20, in other words, then returns to its initial position, and the pills (preferably contained within paper cups 80) may be extracted from the receptacle of the device.

It will be appreciated that the plates 10, 20, and especially upper plate 20 should be constructed of a material strong enough to withstand the forces applied to it. If the material is too thick or heavy, however, this limits the portability of the device. To maintain the portability of the device, a material of slightly less robust material can be used, if support members 70 are applied to the sides of upper plate 20 along that length of plate 20 where the forces are generally applied (perhaps along the first third of the plate). This is illustrated in FIG. 70.

As will be apparent to those skilled in the art in the light of the foregoing disclosure, many alterations and modifications are possible in the practice of this invention without departing from the spirit or scope thereof. For example, while the invention has been described as have a hinge between the lower and upper plates, the plates need not be hinged together for the invention to work. In fact, in the embodiment of the invention shown in FIG. 6, the plates 10, 20 are formed from a single sheet of material which has such natural elastic properties as to normally urge the ends of plates 10, 20 apart, placing the device naturally in an open position. In this case, the "urging means" 54 (FIG. 6) is simply the natural elasticity of the material form which plates 10, 20 are constructed.

Accordingly, the scope of the invention is to be construed in accordance with the substance defined by the following claims.

What is claimed is:

1. A pill crushing device comprising:

(a) a lower plate having a first end and a second end;

(b) an upper plate having an upper surface, a first end and a second end, said second end of said upper plate attached to said second end of said lower plate;

(c) means for urging said first ends of said upper and lower plates apart from one another;

(d) a receptacle for accepting crushable pills, said receptacle projecting upwardly from said first end of said lower plate;

(e) a crushing member projecting downwardly from said first end of said upper plate, said crushing member sized to fit within said receptacle;

(f) a post extending upwardly from said lower plate through said upper plate, said post positioned between said second end of said lower plate and said receptacle; and (g) a handle pivotally attached to said post above said upper plate, said handle having a lobe extending downwardly therefrom to abut and apply a camming force to said upper surface of said upper plate; wherein said device is operable by said handle between a pill-loading position wherein said first ends are urged apart by said urging means and a pill-crushing position wherein said first ends are nearer one another.

2. The pill crushing device of claim 1 wherein said post is positioned nearer to said receptacle than to said second end of said lower plate.

3. The pill crushing device of claim 2 wherein said means for urging said first ends away from one another comprises a spring coiled around said post between said lower and upper plates.

4. The pill crushing device of claim 2 wherein said means for urging said first ends away from one another comprises a leaf spring attached between said lower plate and said upper plate.

5. The pill crushing device of claim 2 wherein said upper and lower plates are formed of one sheet of material bent over on itself, and wherein the said means for urging said first end of said upper plate away from said first end of said lower plate comprises the natural elasticity of said material.

6. The pill crushing device of claim 2 wherein said receptacle has a concave face and said crushing member has a convex end.

7. The pill crushing device of claim 6 wherein said receptacle is sized to accept a paper cup.

8. The pill crushing device of claim 2 wherein an end of said handle is attached to an end of said post.

9. The pill crushing device of claim 2 said upper plate has attached to the sides thereof downwardly extending support members, said support members extending generally along one third of said upper plate from said first end thereof.

10. The pill crushing device of claim 1 wherein said first and second plates are hinged together at said second ends.

* * * * *